United States Patent
Wakabayashi et al.

(10) Patent No.: US 7,189,467 B2
(45) Date of Patent: Mar. 13, 2007

(54) FUEL CELL SYSTEM

(75) Inventors: Keisuke Wakabayashi, Yokosuka (JP); Yasukazu Iwasaki, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 582 days.

(21) Appl. No.: 10/610,752

(22) Filed: Jul. 2, 2003

(65) Prior Publication Data
US 2004/0005489 A1 Jan. 8, 2004

(30) Foreign Application Priority Data
Jul. 5, 2002 (JP) ............. 2002-197118

(51) Int. Cl.
*H01M 8/04* (2006.01)
*H01M 8/18* (2006.01)
(52) U.S. Cl. ............. 429/24; 429/26; 429/22; 429/19; 429/17
(58) Field of Classification Search ............... 429/24, 429/26, 22, 19, 17
See application file for complete search history.

(56) References Cited
U.S. PATENT DOCUMENTS
6,186,254 B1 * 2/2001 Mufford et al. ............ 180/65.3

FOREIGN PATENT DOCUMENTS
| JP | 08-273689 | * | 10/1996 |
|---|---|---|---|
| JP | 8-273689 | | 10/1996 |
| JP | 11-214025 | * | 8/1999 |
| JP | 2001-143736 | * | 5/2001 |
| JP | 2001-143736 A | | 5/2001 |
| JP | 2003-151601 A | | 5/2003 |
| JP | 2003-173804 A | | 6/2003 |
| JP | 2003-288928 A | | 10/2003 |
| JP | 2004-006270 A | | 1/2004 |
| JP | 2006-500733 A | | 1/2006 |
| WO | WO 96/41393 | | 12/1996 |
| WO | WO 02/01662 A1 | | 1/2002 |
| WO | WO 03/041202 A2 | | 5/2003 |
| WO | WO 03/073547 A2 | | 9/2003 |

* cited by examiner

*Primary Examiner*—Patrick Joseph Ryan
*Assistant Examiner*—Angela J. Martin
(74) *Attorney, Agent, or Firm*—McDermott Will & Emery LLP

(57) ABSTRACT

A fuel cell system has a heater (10, 11) for heating water in the fuel cell system; and a controller (100) for controlling the heater. The controller (100) executes a stop mode having the smaller energy consumption of a temperature maintenance mode where water in the fuel cell system is maintained to a temperature greater than freezing point in a period after a shutdown the fuel cell system until a scheduled start-up date-time and a defrost start-up mode where frozen water in the fuel cell system is melted when the fuel cell system undergoes a start-up operation. The controller (100) stores a historical external temperature data for a period prior to the shutdown of the fuel cell system. The historical external temperature data is used for predicting the external temperature for the scheduled start-up date-time. The controller (100) calculates the energy consumption in the defrost start-up mode based on the predicted external temperature.

13 Claims, 13 Drawing Sheets

FUEL CELL SYSTEM

FIELD OF THE INVENTION

This invention relates to a fuel cell system and a method of starting and warming up the fuel cell system.

BACKGROUND OF THE INVENTION

Tokkai 2001-143736 published by the Japanese Patent Office in 2001 discloses a technique of preventing a fuel cell system from freezing even when an external temperature is below freezing point. In this technique, the temperature of the fuel cell is monitored and the fuel cell is maintained at a temperature greater than freezing point until start-up operations for the fuel cell system are commenced.

Tokkai Hei08-273689 published by the Japanese Patent Office in 1996 discloses a technique which allows pure water used in the fuel cell system to freeze. However the pure water is stored before freezing in a designated tank and is melted when start-up operations for the fuel cell system are commenced.

SUMMARY OF THE INVENTION

The prior-art technique disclosed in Tokkai 2001-143736 maintains the temperature conditions of the fuel cell even after the fuel cell system is shut down. As a result, this method requires a high amount of energy corresponding to the energy required to maintain the temperature.

If there is ice in the water tank requiring melting operations, time is required to start the fuel cell system as disclosed in Tokkai Hei08-273689. When the fuel cell system has been shut down for a short time, it is sometimes preferred to maintain the temperature of the fuel cell system to greater than freezing point in order to prevent the water in the fuel cell system from freezing. An example of this situation would be when the energy required for melting the ice at start-up is greater than the energy required to maintain the temperature.

It is therefore an object of this invention to reduce energy consumed from a shutdown of a fuel cell system to a startup of the fuel cell system in a cold place where there is a possibility that the fuel cell system will be at a temperature below freezing point of water.

In order to achieve above objects, this invention provides a fuel cell system comprising: a fuel cell acting as a power source; a heater for heating water in the fuel cell system; a user interface allowing a user to command a scheduled start-up date-time to a controller; and a controller for controlling the operation of the heater and a startup and shutdown operations of the fuel cell system. The controller comprises a historical external temperature data for a period prior to a shutdown of the fuel cell system.

Further, the controller functions to calculate temperature maintenance energy, wherein the temperature maintenance energy is the energy consumed by the heater in order to maintain water in the fuel cell system to a first predetermined temperature in a period after the shutdown of the fuel cell system until the scheduled start-up date-time; predict an external temperature for the scheduled start-up date-time based on the historical external temperature data; calculate defrost start-up energy, wherein the defrost start-up energy is the energy consumed by the heater in order to heat water in the fuel cell system to a second predetermined temperature when the fuel cell system undergoes the start-up operation, the calculation being performed based on the predicted external temperature for the scheduled start-up date-time; compare the temperature maintenance energy and the defrost start-up energy; and to control the heater to maintain water in the fuel cell system to the first predetermined temperature in a period after the shutdown of the fuel cell system until the scheduled start-up date-time if the temperature maintenance energy is smaller than or equal to the defrost start-up energy, and to control the heater to heat water in the fuel cell system to the second predetermined temperature when the fuel cell system is started up if the temperature maintenance energy is greater than the defrost start-up energy.

The details as well as other features and advantages of this invention are set forth in the remainder of the specification and are shown in the accompanying drawings.

DESCRIPTION OF THE PREFERRED EMBODIMENTS

Figure 1:
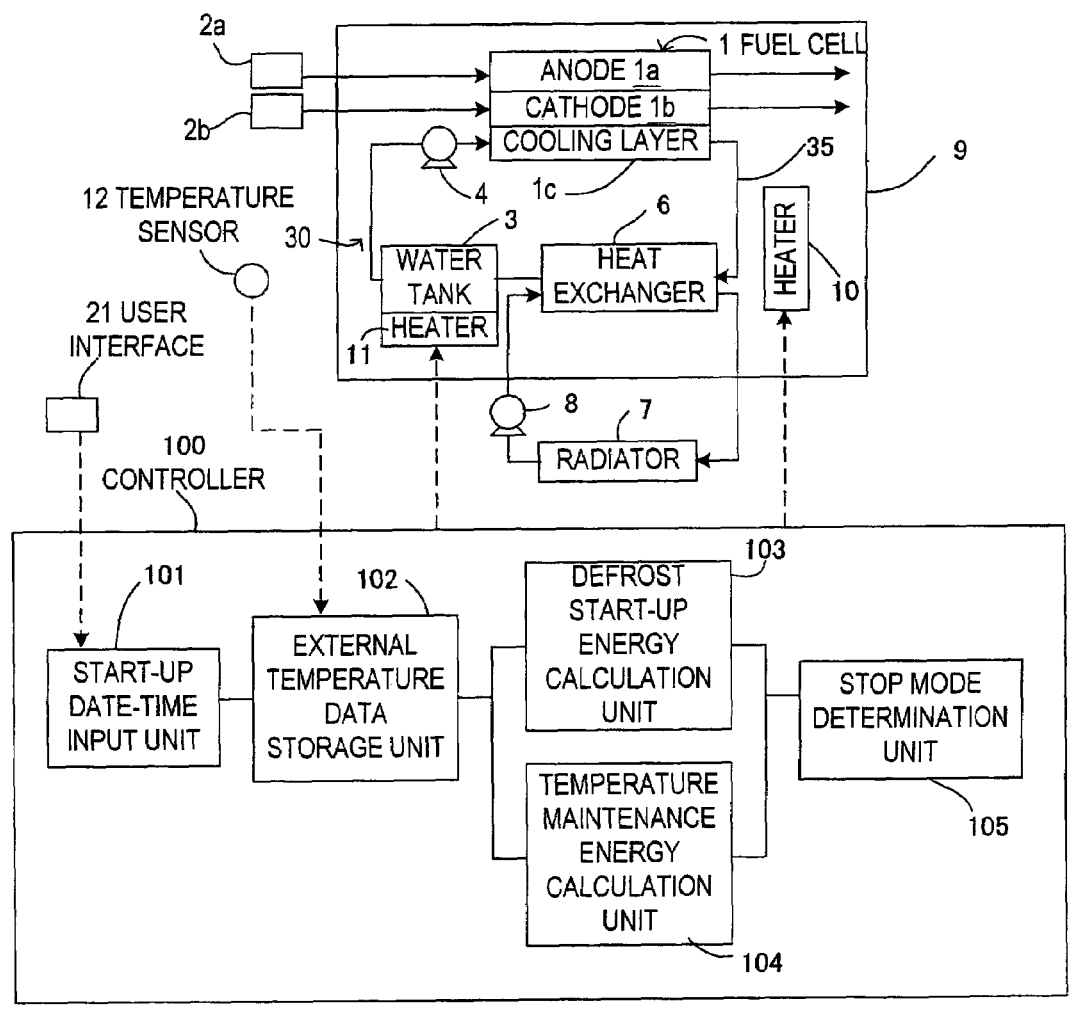
FIG. 1 is a schematic diagram of a fuel cell system according to a first embodiment.

FIG. 1 is a schematic diagram of a fuel cell system applying this invention. A fuel cell 1 is a polymer electrolyte fuel cell and performs power generation operations using electrochemical reactions. Hydrogen is supplied as fuel to an anode 1a from a fuel supply device 2a. Air is supplied as an oxidizing agent from a compressor 2b to a cathode 1b. The fuel cell system is provided with a cooling device 30 in order to cool the fuel cell 1 which undergoes temperature increases resulting from power generation operations. The cooling device 30 comprises a cooling layer 1c in the fuel cell 1, a pure water tank 3, a pump 4, a heat exchanger 6 and a cooling water passage 35. Pure water is supplied as a cooling medium to the cooling layer 1c through the cooling water passage 35 by the pump 4. The pure water is stored in the pure water tank 3. The temperature of the pure water increases as a result of absorbing heat from the fuel cell 1 in the cooling layer 1c. The water is then transferred to the heat exchanger 6. A long life coolant (LLC) circulates between the heat exchanger 6 and a radiator 7 as a result of the action of the pump 8. The LLC radiates heat via the radiator 7 and the LLC undergoes heat exchange in the heat exchanger 6. Thereafter the pure water which has been cooled in the heat exchanger 6 is stored in the pure water tank 3. Conversely the LLC which has absorbed heat from the pure water in the heat exchanger 6 radiates that heat from the radiator 7.

The fuel cell system is provided with a thermal insulation member 9 for covering the fuel cell 1, the cooling device 30, a first heater 10 and a second heater 11 which are provided in the thermal insulation member 9. The thermal insulation member 9 may be a case for enclosing the fuel cell 1, the cooling device 30, a first heater 10 and a second heater 11. The first heater 10 is used for maintaining the temperature of the water in the fuel cell system at a temperature greater than freezing point. In this manner, pure water in the fuel cell system is prevented from freezing. A second heater 11 is further provided in contact with the pure water tank 3 in order to melt the water in the pure water tank 3 when the pure water in the pure water tank 3 has frozen. The first and second heaters 10, 11 are combustors for combusting fuel supplied from the fuel supply device 2a in order to produce heat. The fuel from the fuel supply device 2a is supplied to the first and second heaters 10, 11 through a supply pipe (not shown). The fuel supply device 2a may comprise a fuel tank for storing fuel.

The first and second heaters 10, 11 are not limited to combustors and may be electric heaters. When the output of the second heater 11 is large, instead of the first heater 10, the second heater 11 may be used in order to prevent the pure water in the fuel cell system from freezing. When the output of the first heater 10 is large, instead of the second heater 11, the first heater 10 may be used in order to melt the frozen water in the pure water tank 3.

The fuel cell system is provided with a controller 100 which controls the operation of the fuel cell system. The controller 100 comprises a microcomputer provided with a central processing unit (CPU) for executing programs, a read-only memory (ROM) for storing data or programs, a random access memory (RAM) for temporarily storing retrieved data and calculation results from the CPU and an input/output interface (I/O interface). The controller 100 may comprise a plurality of microcomputers. The ROM stores programs comprising control routines for controlling the fuel cell system. The controller 100 controls the operation of the first and second heaters 10, 11 based on the detection values of the temperature sensor 12 which detects the external temperature which is the air temperature outside the thermal insulation member 9 or the fuel cell system. The temperature sensor 12 is positioned at the outside of the thermal insulation member 9. The first and second heaters 10, 11, the temperature sensor 12, the fuel supply device 2a and the compressor 2b are electronically connected to the controller 100 and are responsive to command signals from the controller 100. The temperature sensor 12 transfers a signal indicative of the external temperature to the controller 100.

The controller 100 determines a stop mode when the fuel cell system is shut down. More precisely, the stop mode comprises a defrost start-up mode and a temperature maintenance mode and is selected on the basis of the energy consumption in the fuel cell system from shutdown to start-up. The defrost start-up mode is a mode in which frozen water (ice) is melted at start-up of the fuel cell system. The temperature maintenance mode is a mode in which the fuel cell system is maintained at a temperature greater than freezing point even after a shutdown of the fuel cell system.

The controller 100 is provided with a processing unit as shown in FIG. 1. The processing unit comprises a start-up date-time input unit 101 for storing a scheduled start-up date and time (date-time), an external temperature data storage unit 102 for making and storing historical external temperature data, a defrost start-up energy calculation unit 103 for calculating the defrost start-up energy Ea, a temperature maintenance energy calculation unit 104 for calculating the temperature maintenance energy Eb, and a stop mode determination unit 105 for selecting the stop mode. These units are virtual units provided via the functions of the CPU, ROM, RAM and the I/O interface of the controller 100. When the controller 100 comprises a plurality of microcomputers, these units may comprise respectively a microcomputer.

The temperature maintenance energy is the energy required for maintaining the temperature of the water in the fuel cell system to a first predetermined temperature greater than freezing point while the fuel cell system is shut down. The defrost start-up energy Ea is the energy required for melting the frozen water in the fuel cell system and then heat the melted water to the second predetermined temperature when the fuel cell system is started up. The first and second predetermined temperatures are respectively greater than the freezing point of water and less than an operating temperature range of the fuel cell. It is preferred that the first and second predetermined temperatures are slightly larger than freezing point of water.

The start-up date-time unit 101 may be formed from the CPU, I/O interface and a program module operated by the CPU. The start-up date-time unit 101 retrieves data for a scheduled start-up date-time through the I/O interface when a user of the fuel cell inputs data with respect to a scheduled start-up date-time via a user interface 21. The user interface 21 is electrically coupled to the controller 100 and allows a user to command a scheduled start-up date-time to the controller 100.

The external temperature data storage unit 102 detects the external temperature from the temperature sensor 12 using the I/O interface and stores the result in the RAM. The external temperature data storage unit 102 may be formed from the CPU, RAM, I/O interface and a program operated by the CPU. The external temperature data storage unit 102 detects the external temperature at regular time intervals (for example every one hour) via the temperature sensor 12. The temperature detection operations are performed in the 24 hours prior to shutting down the fuel cell system or on the day before the fuel cell system is shut down. The sets of the detected external temperature and the date-time of the detection are stored in the RAM as historical external temperature data. The defrost start-up energy calculation unit 103, the temperature maintenance energy calculation unit 104 and the stop mode determination unit 105 may be respectively formed from the CPU and a program module operated by the CPU.

When the fuel cell system is in a normal operation other than start-up and shutdown operations, fuel and air are supplied to the fuel cell 1 and the fuel cell 1 performs power generation operations. The generated power is supplied to a motor for driving a vehicle for example. The temperature of the fuel cell 1 increases as a result of the power generation operations. However the fuel cell 1 is cooled by the pure water and maintained in the operating temperature range in which a rated power of the fuel cell is reached. Pure water which is heated as a result of absorbing the heat of the fuel cell 1 is cooled by the LLC at the heat exchanger 6 and is returned to the pure water tank 3.

When a user commands the controller 100 to shut down the fuel cell system via the user interface 21, the supply of air and fuel to the fuel cell 1 is stopped and power generation operations by the fuel cell are terminated. The pumps 4, 8 are also powered off at this time and the operation of the cooling device 30 is shut down. When a user commands the controller 100 to start the operation of the fuel cell system via the user interface 21, the fuel cell system commences start-up operations. During start-up operations, water in the cooling device 30 is melted in the defrost start-up mode. After the start-up operations of the fuel cell system are completed, the pumps 4, 8 are powered on and the operation of the cooling device 30 is started. Consequently power generation operations by the fuel cell are commenced by a supply of air and fuel to the fuel cell 1.

The control routine executed by the controller 100 during shut down operations for the fuel cell system will be described referring to the flowchart in FIG. 2. The control routine is executed by the CPU using a program stored in the ROM.

Figure 7:
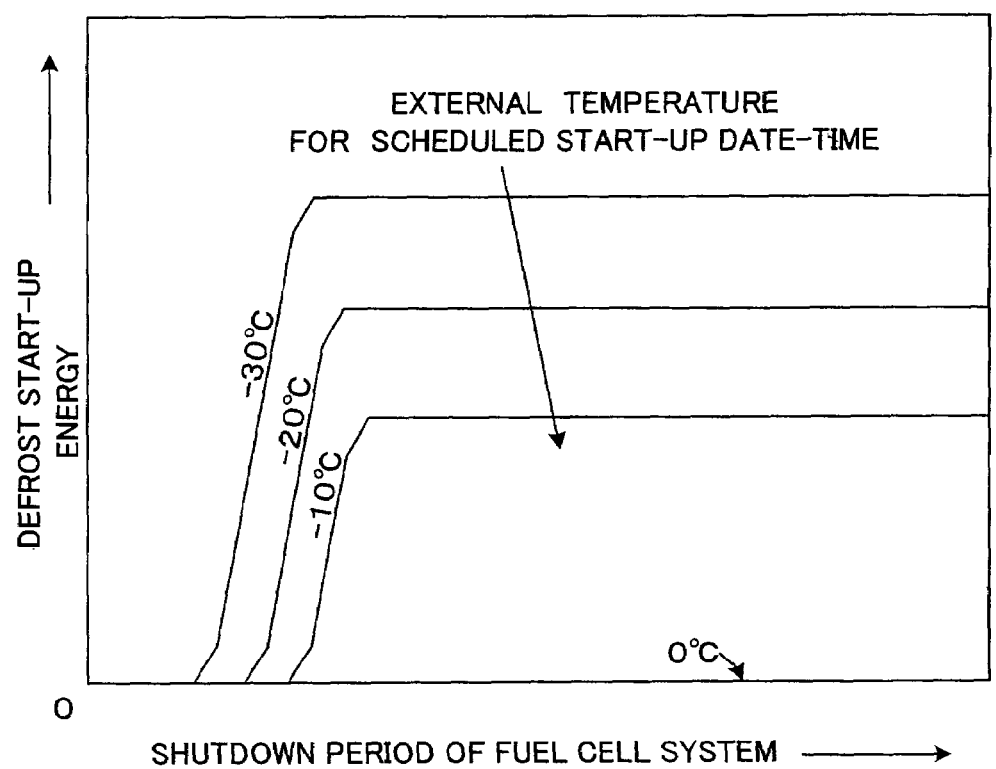
FIG. 7 is a map showing the relationship between defrost start-up energy and elapsed time after shutting down the fuel cell system.

Firstly in a step S10, the scheduled start-up date-time for the fuel cell system is read. The scheduled start-up date-time is input by a user using the user interface 21. When no scheduled start-up date-time has been inputted, the scheduled start-up date-time is read after the scheduled start-up date-time is inputted. The start-up date-time input unit 101 performs the step S10. In a step S20, the historical external temperature data stored by the external temperature data storage unit 102 is read. The data read in the steps S10 and S20 are input into the defrost start-up energy calculation unit 103 and the temperature maintenance energy calculation unit 104. In a step S30, the defrost start-up energy is calculated. The defrost start-up energy corresponds to the energy consumed by the heater while performing defrosting operations during start-up with respect to moisture which has frozen after the fuel cell system was shut down. It is possible to calculate the defrost start-up energy using a map for example as shown in FIG. 7 based on an expected external temperature for the scheduled start-up time. The external temperature for the scheduled start-up time can be predicted from the historical external temperature data by searching historical external temperature for a time of day close to the scheduled start-up time.

For example, when the shutdown date-time of the system is March 22 0:00, the historical external temperature data may be as follows:

| | | |
|---|---|---|
| (Mar. 21 0:00, −1° C.) | (Mar. 21 1:00, −1° C.) | (Mar. 21 2:00, −2° C.) |
| (Mar. 21 3:00, −3° C.) | (Mar. 21 4:00, −3° C.) | (Mar. 21 5:00, −4° C.) |
| (Mar. 21 6:00, −5° C.) | (Mar. 21 7:00, −4° C.) | (Mar. 21 8:00, −2° C.) |
| (Mar. 21 9:00, 0° C.) | (Mar. 21 10:00, 2° C.) | (Mar. 21 11:00, 4° C.) |
| (Mar. 21 12:00, 7° C.) | (Mar. 21 13:00, 10° C.) | (Mar. 21 14:00, 13° C.) |
| (Mar. 21 15:00, 13° C.) | (Mar. 21 16:00, 11° C.) | (Mar. 21 17:00, 9° C.) |
| (Mar. 21 18:00, 7° C.) | (Mar. 21 19:00, 5° C.) | (Mar. 21 20:00, 4° C.) |
| (Mar. 21 21:00, 3° C.) | (Mar. 21 22:00, 2° C.) | (Mar. 21 23:00, 0° C.) |

If the scheduled start-up date and time is March 22 8:15, the defrost start-up energy is calculated based on the external temperature for March 21 8:00 (which is −2° C.).

Figure 8:
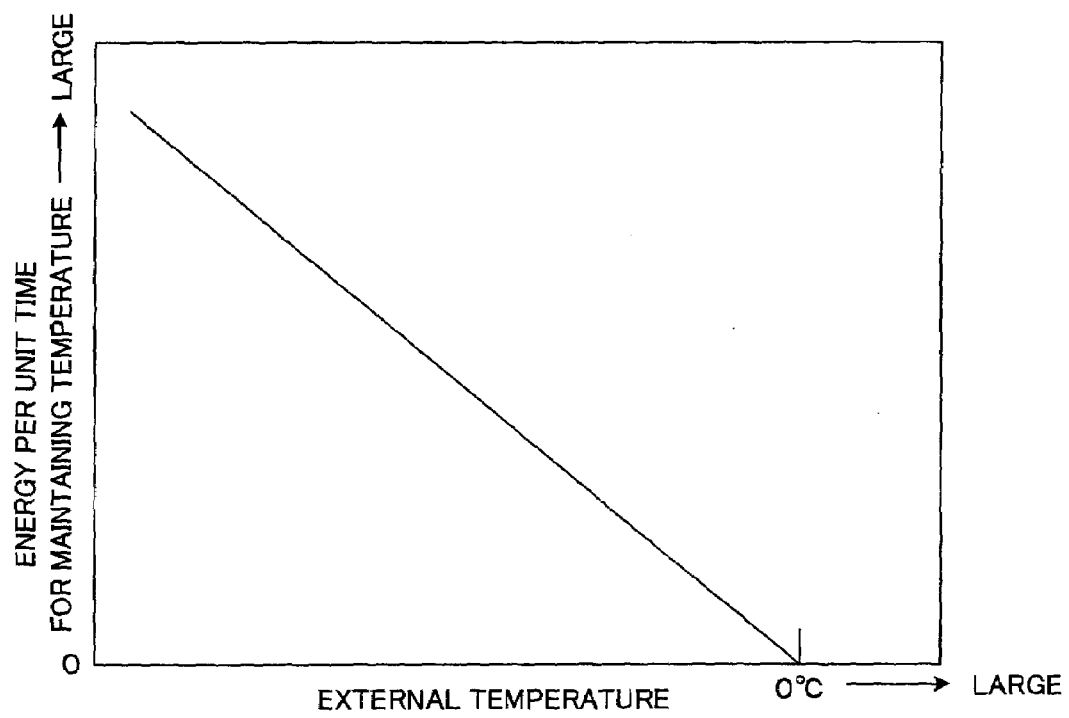
FIG. 8 is a map showing the relationship between energy per unit time for maintaining temperature and ambient temperature.

In a step S40, the temperature maintenance energy Eb is calculated. The temperature maintenance energy is the energy consumed by the heater after the shutdown of the fuel cell system in order to maintain the fuel cell system to a first predetermined temperature at which moisture or water in the fuel cell system does not freeze. The external temperature at fixed time intervals from the shutdown to the startup of the system is predicted by referring to the historical external temperature data above. In other words, the variation of external temperature over time from the shutdown to the startup of the system is predicted by referring to the historical external temperature data. Subsequently, the energy required for maintaining the temperature per unit time is calculated using a map for example as shown in FIG. 8 based on a predicted external temperature. The temperature maintenance energy required to maintain the temperature from the shutdown date-time to a scheduled start-up date-time is calculated as the sum of the required energy per unit time after the system is shut down until a scheduled start-up date-time or is calculated by integrating over time the required energy per unit time from the shutdown date-time to the scheduled start-up date-time. Therefore the temperature maintenance energy is predicted and calculated based on historical external temperature data including the external temperature on the previous date-time before the system is shut down. The historical external temperature data may include temperature on the day the system is shut down or on the day before the system is shut down. Thus the temperature maintenance energy can be calculated more accurately when the elapsed time between the shutdown of the system and the restart of the system is short, for example when it is within 24 hours.

In a step S50, the defrost start-up energy and the temperature maintenance energy calculated in the step S30 and S40 are compared. When the defrost start-up energy Ea is smaller than the temperature maintenance energy Eb, the routine proceeds to a step S60 where defrost start-up mode is selected. When the temperature maintenance energy Eb is smaller than the defrost start-up energy Ea, the routine proceeds to a step S70 where temperature maintenance mode is selected.

In the defrost start-up mode, the controller 100 controls the second heater 11 during start-up operations for the fuel cell system so as to defrost the frozen water in the pure water tank 3 and to heat the melted water to the second predetermined temperature. However, in the defrost start-up mode, the first heater 10 and the second heater 11 is not operated in a period after the shutdown of the fuel cell system until the scheduled start-up date-time. In the temperature maintenance mode, the controller 100 operates the first heater 10 even when the system is shut down so as to maintain the temperature of the system. The controller 100 controls the first heater 10 to maintain water in the fuel cell system to a first predetermined temperature greater than freezing point in a period after the shutdown of the fuel cell system until the scheduled start-up date-time.

According to the first embodiment, the defrost start-up energy calculation unit 103 includes a program module corresponding to the step S30. The defrost start-up energy calculation unit 104 includes a program module corresponding to the step S40. The stop mode determination unit 105 includes a program module corresponding to the step S50.

The controller 100 may execute the control routine above only when the external temperature after the fuel cell system is shut down until a scheduled start-up date-time is predicted to be less than freezing point or only when the external temperature detected by the temperature sensor 12 is less than freezing point at shut-down of the fuel cell system was.

In the first embodiment, the temperature maintenance energy and the defrost start-up energy are calculated based on the historical external temperature data made before the fuel cell system is shut down. Thereafter it is possible to select the stop mode having a lower energy consumption. Consequently the energy consumption of the fuel cell system can be reduced.

Figure 3:
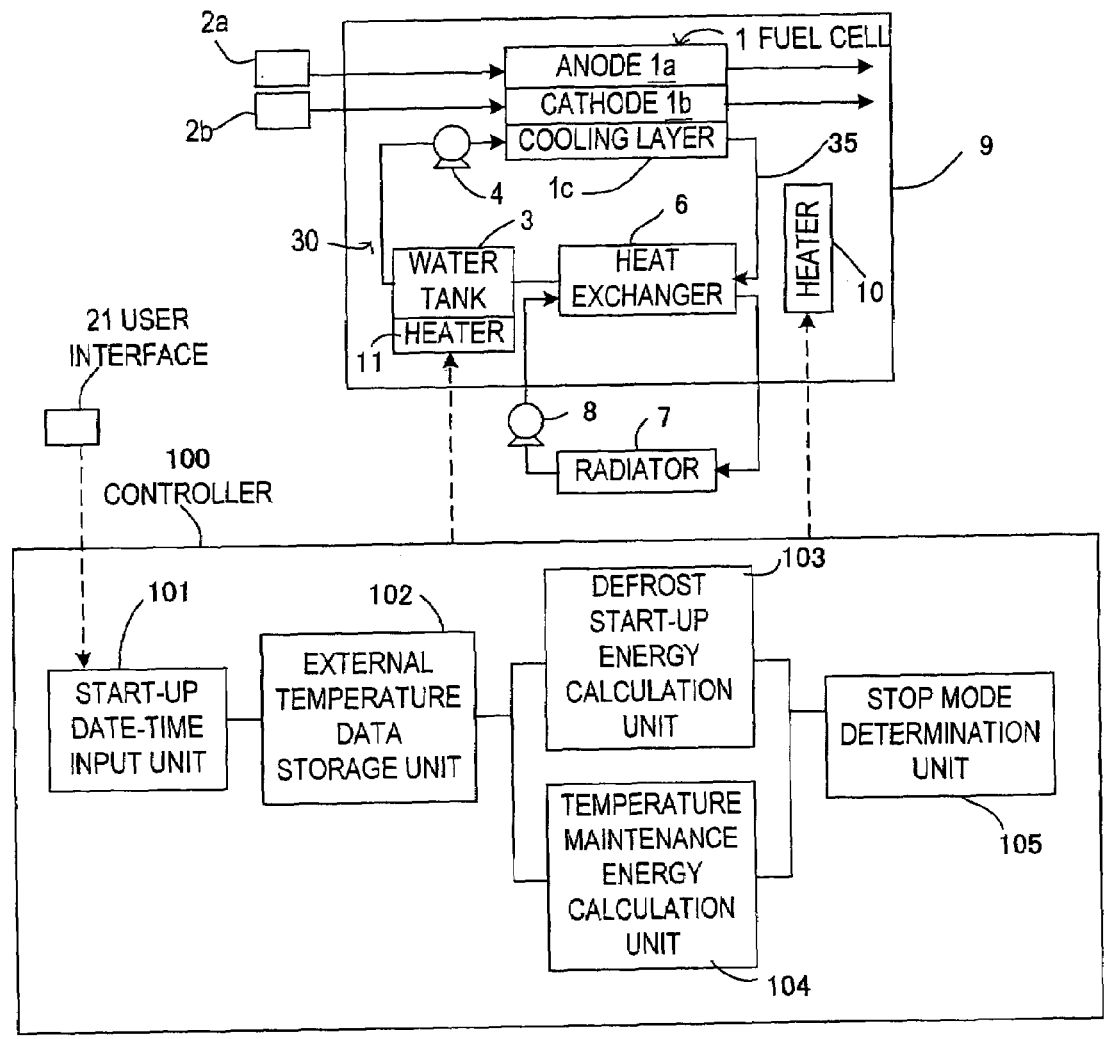
FIG. 3 is a schematic diagram of a fuel cell system according to a second embodiment.

FIG. 3 shows a fuel cell system according to a second embodiment. The second embodiment is structurally different in that the temperature sensor 12 in the first embodiment is omitted. Furthermore the historical external temperature data stored by the external temperature date storage unit 102 is different. That is to say, the external temperature data storage unit 102 includes the ROM and at least one year of historical external temperature data is stored in the ROM.

Figure 4:
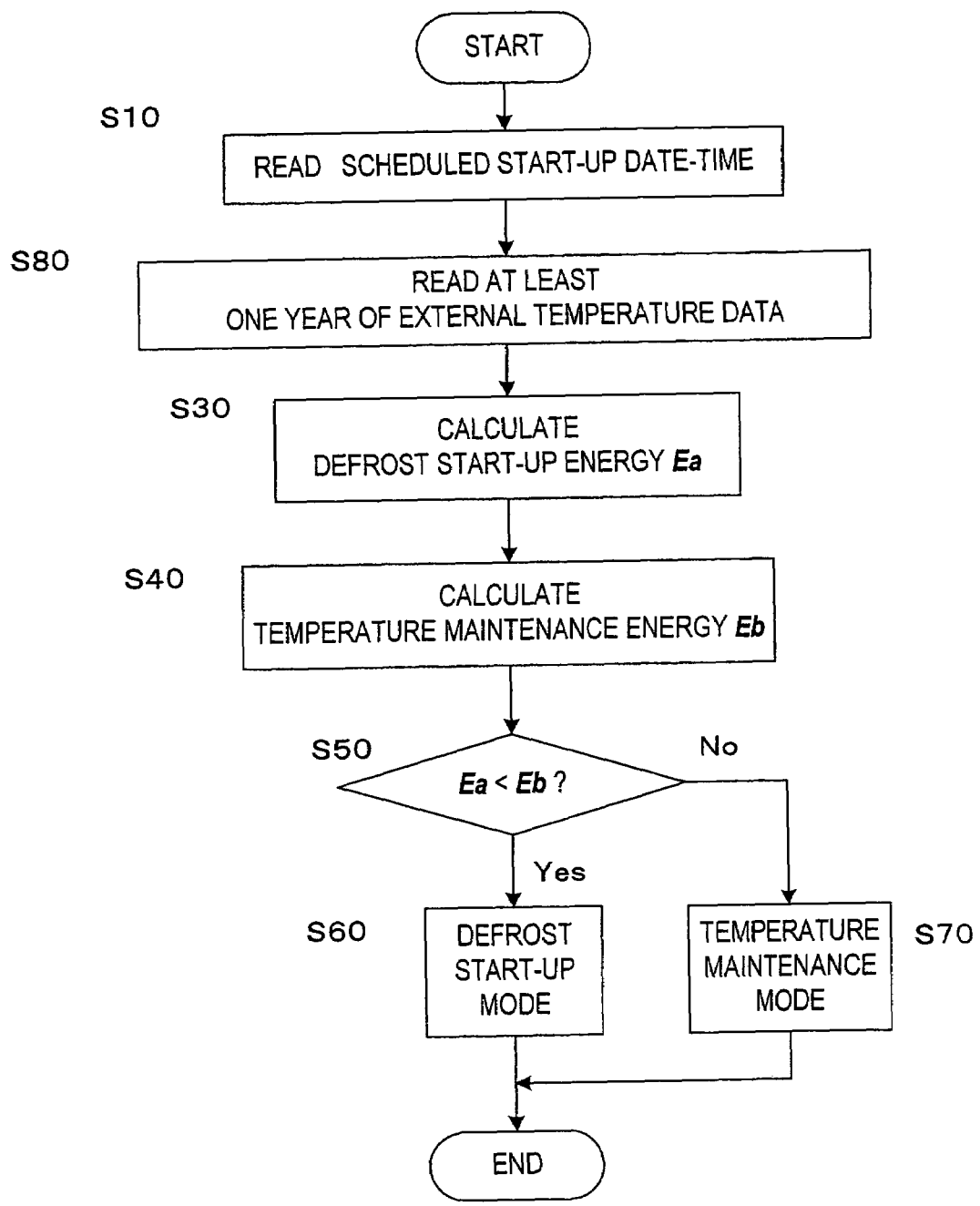
FIG. 4 is a flowchart showing a control routine according to the second embodiment.

The control routine performed by the controller 100 according to the second embodiment will be described referring to the flowchart in FIG. 4.

Figure 2:
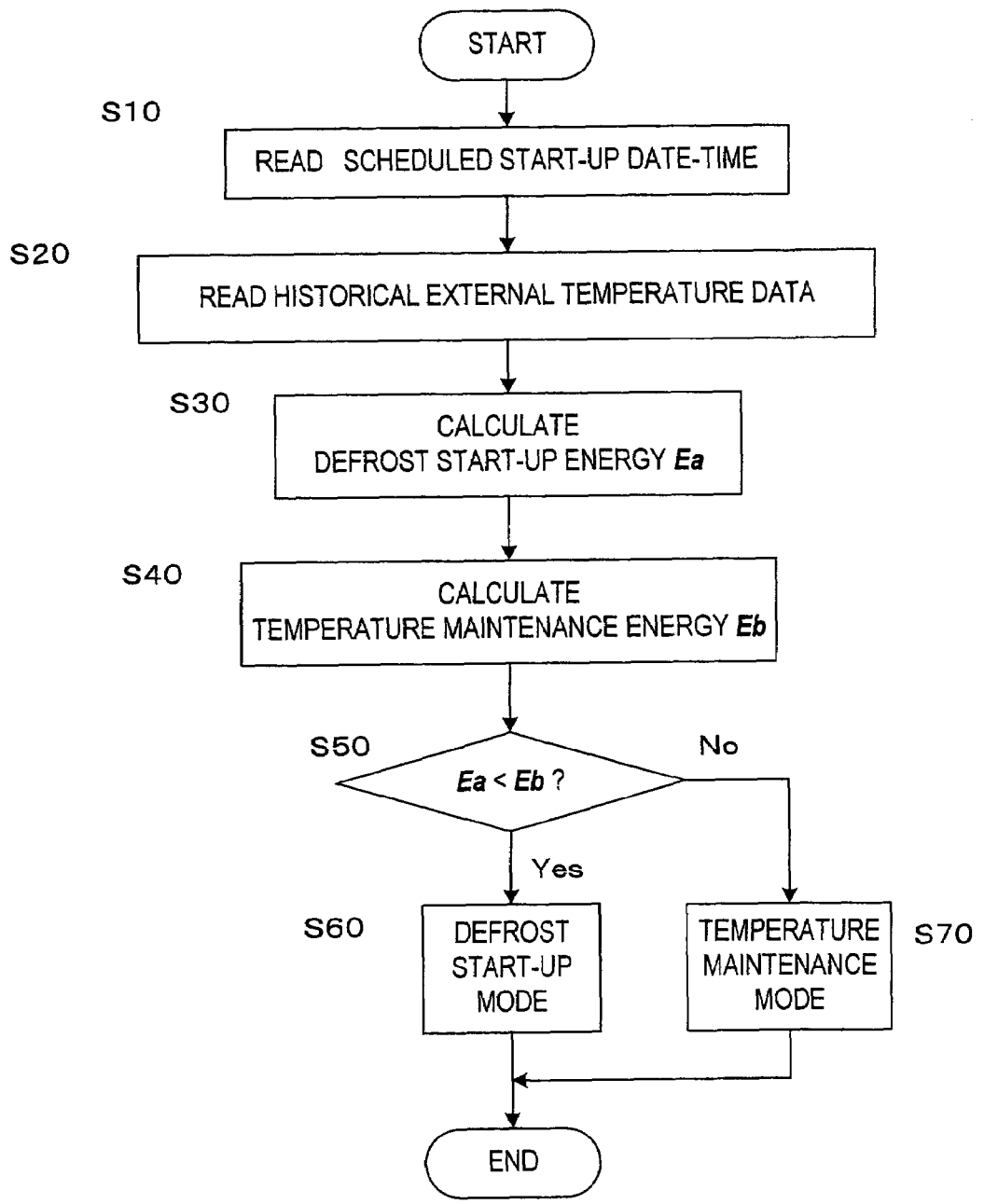
FIG. 2 is a flowchart showing a control routine according to a first embodiment.

Instead of the step S20 shown in FIG. 2 which shows the control routine according to the first embodiment, a step S80 is provided in the flowchart. In the step S80, pre-stored historical external temperature data is read. This historical external temperature data is at least for the place where the fuel cell system is to be used, and is stored in the ROM when the system is manufactured. At least one year of external temperature data is stored as the historical external temperature data. When a plurality of years of historical external temperature data are stored, a plurality of external temperature data exists for date-times corresponding to a scheduled start-up date-time. In this case, an average external temperature based on the plurality of years of historical external temperature data may be read as the relevant datum. Defrost start-up energy is calculated in the step S30 based on historical external temperature data for date-times corresponding to the scheduled start-up date-time. The temperature maintenance energy is also calculated based on historical external temperature data for date-times included in a period corresponding to the period from the shutdown date-time to the scheduled start-up date-time. For example, if historical external temperature data includes the data on date-times from Jan. 1, 2000 to Dec. 31, 2000 and if the period from the shutdown date-time to the scheduled start-up date-time is from 0:00 May 1, 2004 to 9:00 May 10, 2004, then the temperature maintenance energy is calculated based on historical external temperature data from 0:00 May 1, 2000 to 9:00 May 10, 2000.

According to the second embodiment, when the fuel cell system is shut down for a long period, for example when the period exceeds one week, the temperature maintenance energy and the defrost start-up energy are calculated based on at least one year of historical external temperature data. In this manner, it is possible to select the stop mode having lower energy consumption without providing a temperature sensor to detect the external temperature.

Figure 5:
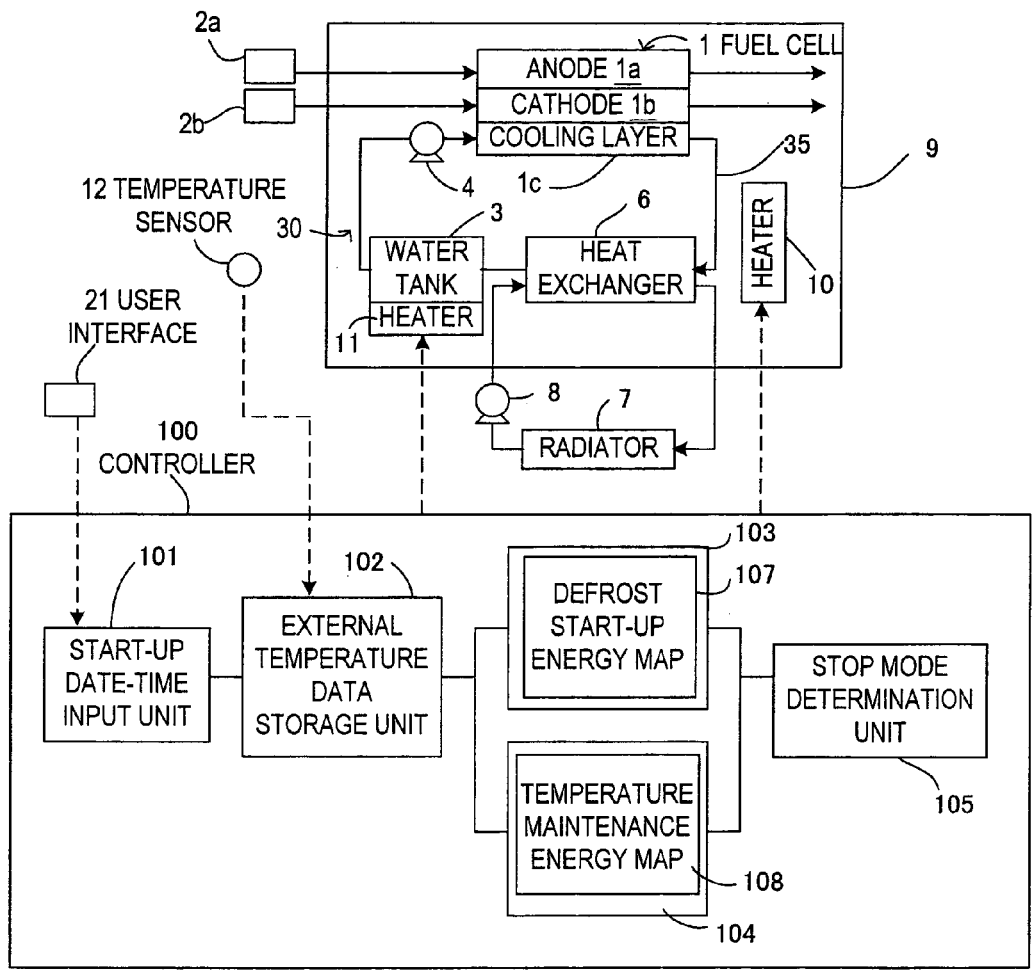
FIG. 5 is a schematic diagram of a fuel cell system according to a third embodiment.

FIG. 5 shows a fuel cell system according to the third embodiment. This embodiment may be structurally identical to the first embodiment, however it differs with respect to the structure of the controller 100.

This embodiment differs from the first embodiment in that the defrost start-up energy calculation unit 103 comprises a defrost start-up energy map 107 which pre-stores the defrost start-up energy in map form. Furthermore the temperature maintenance energy calculation unit 104 is provided with a temperature maintenance energy map 108 which pre-stores the temperature maintenance energy per unit time in map form. These maps are respectively stored in a ROM.

Figure 6:
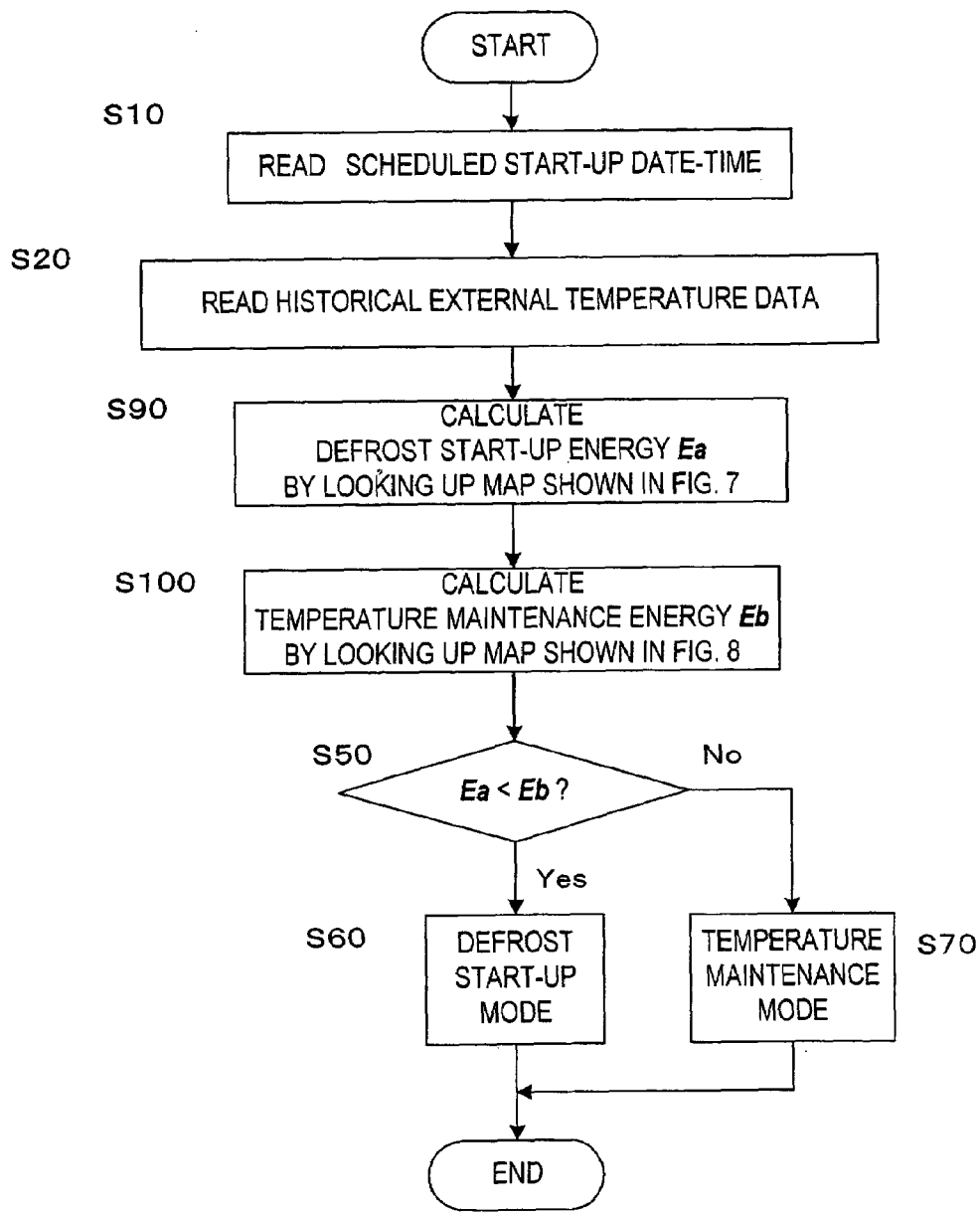
FIG. 6 is a flowchart showing a control routine according to the third embodiment.

The control routine executed by the controller 100 according to the third embodiment will be described with respect to the flowchart shown in FIG. 6.

The point of difference from the flowchart in FIG. 2 showing the control routine according to the first embodiment is that the steps S90 and S100 are provided instead of the steps S30, S40. The method of reading the external temperature data in the step S20 is not restricted to the method described in the first embodiment, and the method in the step S80 in the second embodiment may also be used.

In the step S90, the defrost start-up energy is calculated based on the shutdown period of the fuel cell system by looking up the map shown in FIG. 7 and by using a predicted external temperature for the scheduled start-up date-time obtained from the historical external temperature data. The shutdown period is a period from the shutdown date-time to the scheduled start-up date-time of the fuel cell system. In the step S100, the temperature maintenance energy is calculated by looking up the map shown in FIG. 8 and historical external temperature data.

The map shown in FIG. 7 shows the relationship between defrost start-up energy and the shutdown period of the fuel cell system. The defrost start-up energy shown in FIG. 7 becomes constant after a predetermined period has elapsed from the shutdown of the system. The map shown in FIG. 8 shows the relationship between temperature maintenance energy per unit time (for example one hour) and the external temperature. The temperature maintenance energy per unit time decreases as the external temperature increases.

Thus since a map which pre-stores the temperature maintenance energy and the defrost start-up energy is used in the third embodiment, the defrost start-up energy and the temperature maintenance energy can be calculated accurately. In this manner, it is possible to select the stop mode having lower energy consumption and to reduce the calculation load on the controller by using the map.

Figure 9:
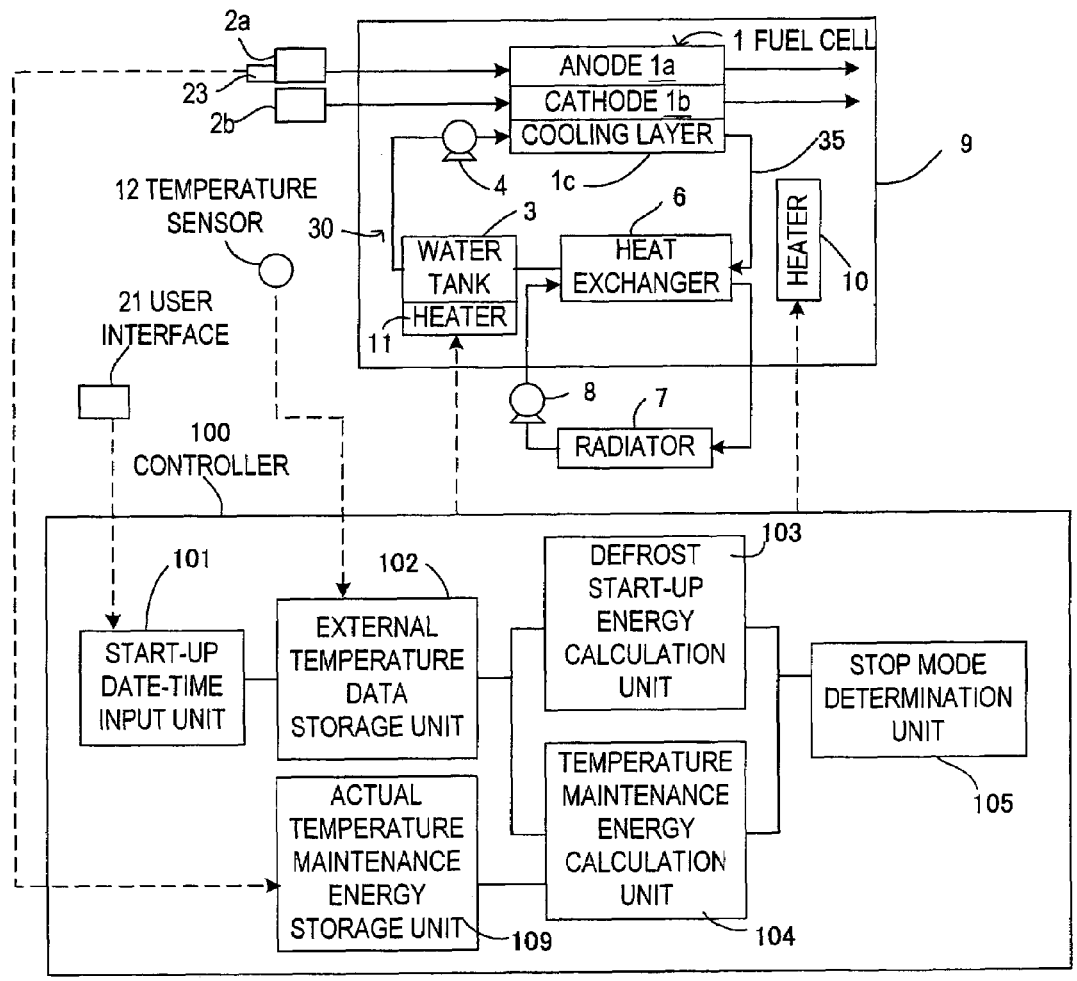
FIG. 9 is a schematic diagram of a fuel cell system according to a fourth embodiment.
Figure 10:
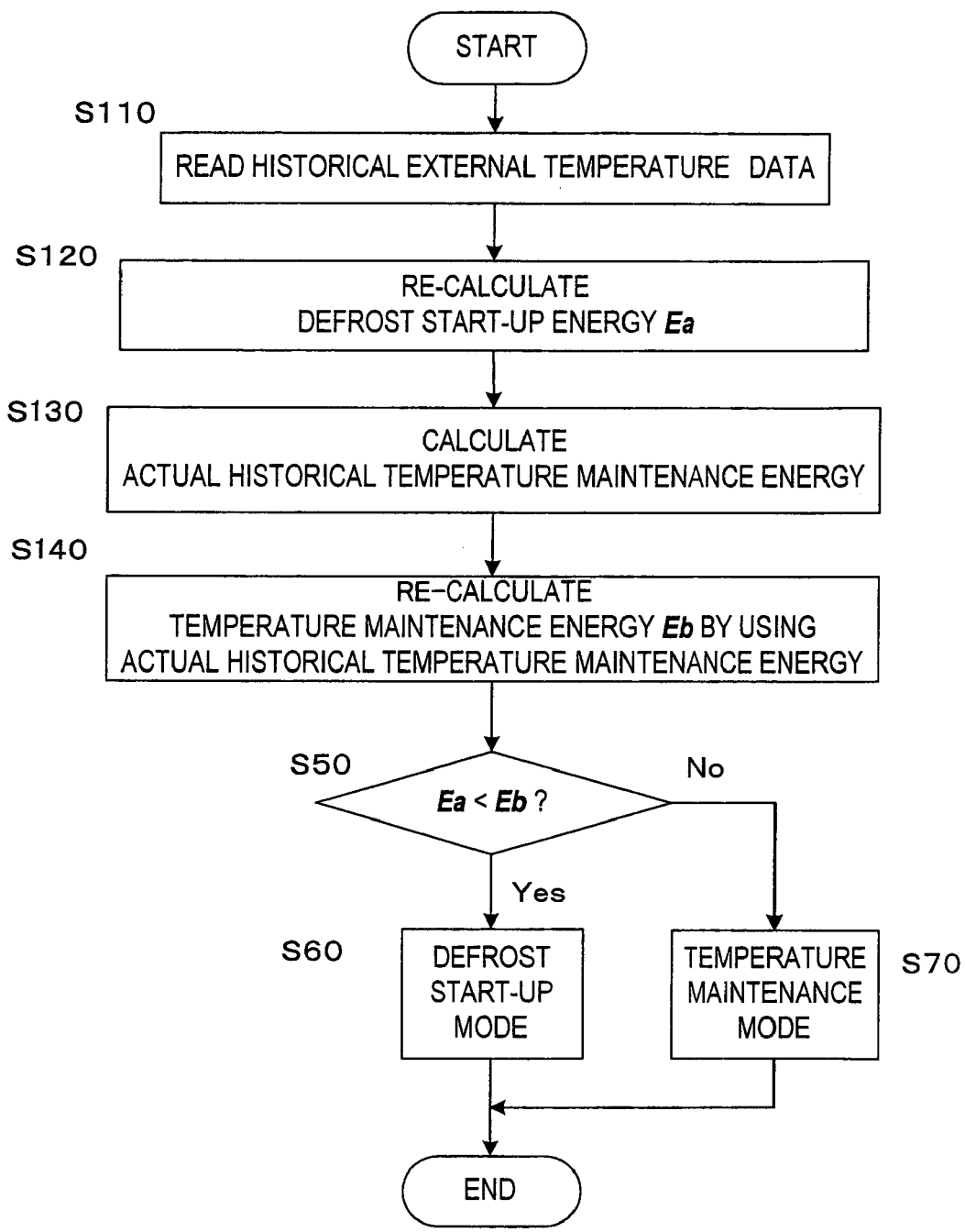
FIG. 10 is a flowchart showing a control routine according to the fourth embodiment.

FIG. 9 shows a fuel cell system according to the fourth embodiment. FIG. 10 shows a flowchart according to the fourth embodiment. The mechanical structure shown in FIG. 9 is similar to that shown in the first and the second embodiments. However the controller 100 is further provided with an actual temperature maintenance energy storage unit 109 which calculates the temperature maintenance energy by detecting the fuel supply amount of the fuel supply device 2*a*. Further the fuel supply device 2*a* is provided with a sensor 23 for detecting the supplied fuel amount (fuel consumption amount) to the first and second heaters 10, 11. The sensor 23 may detect the variation in the fuel amount of the fuel tank when fuel is supplied to the first and second heaters 10, 11 (in this time, fuel is not supplied to the fuel cell 1).

The control routine executed by the controller 100 according to this embodiment will be described referring to the flowchart in FIG. 10. The same or similar components are designated by the same reference numerals as those used in the other embodiments and additional description is omitted.

When the fuel cell system is shut down in temperature maintenance mode, the energy (for example, the fuel consumption amount) previously consumed by the heaters 10, 11 in a predetermined period after the shutdown of the fuel cell system is calculated. The stop mode is re-selected on the basis of a comparison of defrost start-up energy with the sum of the predicted temperature maintenance energy required in the future and the historical value for the temperature maintenance energy.

When temperature maintenance mode is selected as the stop mode for controlling the fuel cell system, the control routine described hereafter is executed when the predetermined period has elapsed after starting temperature maintenance mode.

Firstly in a step S110, historical external temperature data as described in the first or the second embodiment is read. In a step S120, the defrost start-up energy is re-calculated by the defrost start-up energy calculation unit 103 based on the historical temperature data.

Next in a step S130, the actual historical temperature maintenance energy is calculated by the actual temperature maintenance energy storage unit 109 based on the fuel consumption amount after system shutdown until the temperature maintenance energy is re-calculated. Then in a step S140, the energy to be consumed from the time the temperature maintenance energy is re-calculated until the scheduled start-up date-time is estimated. In other words, the energy to be consumed after the predetermined period until the scheduled start-up date-time is estimated. The estimated energy is added to the actual historical temperature maintenance energy in order to calculate the temperature maintenance energy.

In the step S50, either defrost start-up mode or temperature maintenance mode is selected by comparing the defrost start-up energy with the temperature maintenance energy.

Thus in the fourth embodiment, it is possible to re-calculate the temperature maintenance energy more accurately by calculating the actual historical temperature maintenance energy based on the fuel consumption amount used after the system is shut down. Furthermore it is possible to improve the accuracy of stop mode selection and to increase the efficiency of the fuel cell system.

Figure 11:
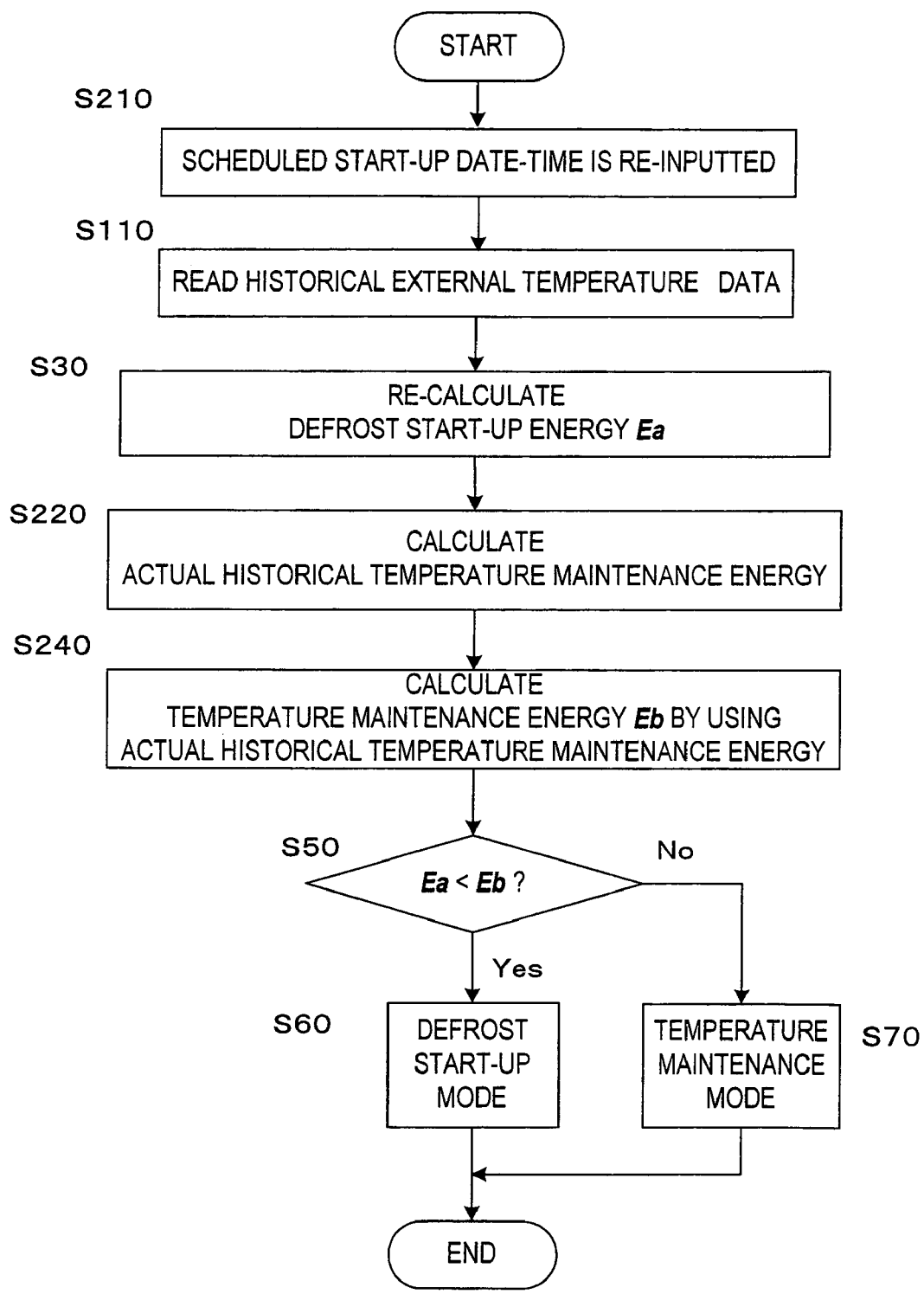
FIG. 11 is a flowchart showing a control routine according to a fifth embodiment.

FIG. 11 is a flowchart showing the control routine executed by the controller 100 in a fifth embodiment. The mechanical structure of this embodiment is the same as the fourth embodiment.

Although this embodiment is similar to the fourth embodiment, it comprises a stop mode selection method performed when the fuel cell system fails to start-up on the original scheduled start-up date-time.

Firstly in a step S210, a user re-inputs a scheduled start-up date-time. When this is not inputted, defrost start-up mode may be selected.

Then in the step S110, the historical external temperature data is read and in the step S30 the defrost start-up energy is re-calculated based on the scheduled start-up date-time re-input in the step S210.

Then in a step S220, the actual historical temperature maintenance energy is calculated based on the energy (fuel consumption amount) consumed by the heaters 10, 11 after the shutdown of the system until the original scheduled start-up date-time. In the step S240, the energy to be consumed from the original scheduled start-up date-time to the newly-set scheduled start-up date-time is estimated. The sum of the energy estimated above and the actual historical temperature maintenance energy calculated in the step S220 is calculated as the temperature maintenance energy. In the step S50, the defrost start-up energy is compared with the temperature maintenance energy to select the stop mode.

In the fifth embodiment, the scheduled start-up date-time is re-entered when start-up is not performed at the original start-up date-time entered at shutdown of the system, in other words, when start-up is not performed at the previously scheduled start-up date-time. In this case, the actual historical temperature maintenance energy corresponding to the energy consumed by the heaters 10, 11 up to the original scheduled start-up date-time is added to the temperature maintenance energy in the period from the original scheduled start-up date-time to the newly-set scheduled start-up date-time. This allows the temperature maintenance energy to be calculated more accurately A sixth embodiment will be described hereafter referring to FIG. 12 and FIG. 13.

In this embodiment, a stop mode selection method is disclosed which takes into account geographical regions in which the defrost start-up energy undergoes conspicuous variation due to large variations in the daily atmospheric temperature.

Figure 12:
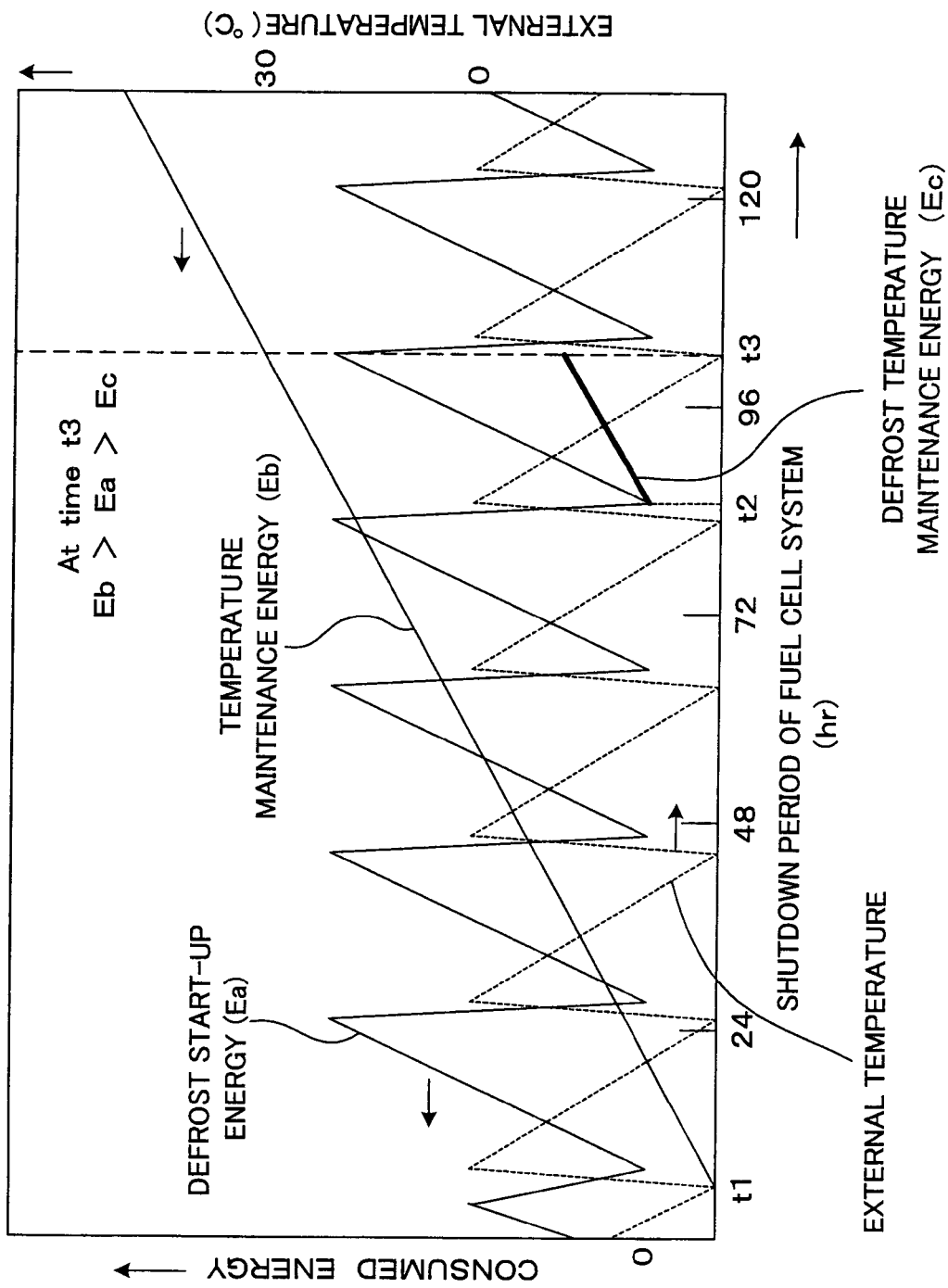
FIG. 12 is a map showing the relationship of energy consumption to elapsed time after shutting down a fuel cell system according to a sixth embodiment.

Referring to FIG. 12, this situation is described. In FIG. 12, the fuel cell system is shut down at time 0. When the stop mode of the fuel cell system is temperature maintenance mode, heating operations are commenced in order to maintain the fuel cell system to the first predetermined temperature when the temperature of the fuel cell system is reduced to the first predetermined temperature at the time t1. Then, the temperature maintenance energy Eb is substantially proportional to elapsed time.

On the other hand, when the stop mode is defrost start-up mode, the defrost start-up energy Ea varies up and down in response to the external temperature (shown by the broken line) at the start-up time of the fuel cell system.

This embodiment shows a defrost temperature maintenance mode. In defrost temperature maintenance mode, the same control is performed as in defrost start-up mode until the defrosting takes place at the maximum external temperature (time t2) during the day before start-up. After defrosting operations have occurred at time t2, temperature maintenance operations are performed so as to maintain water in the fuel cell system at the first predetermined temperature, as shown by a bold line in FIG. 12. That is to say, the defrost temperature maintenance mode is a combination of the defrost start-up mode and temperature maintenance mode in the above embodiments.

When the normal operation of the fuel cell system starts at a minimum external temperature (at time t3), the energy Ec consumed in the defrost temperature maintenance mode is smaller than that in the defrost start-up mode Ea and that in temperature maintenance mode Eb.

In geographical regions where large daily atmospheric temperature variations occur, it is sometimes the case that it is possible to eliminate energy consumption by using a defrost temperature maintenance mode. This is due to the fact that defrosting operations can be performed at the maximum external temperature.

Figure 13:
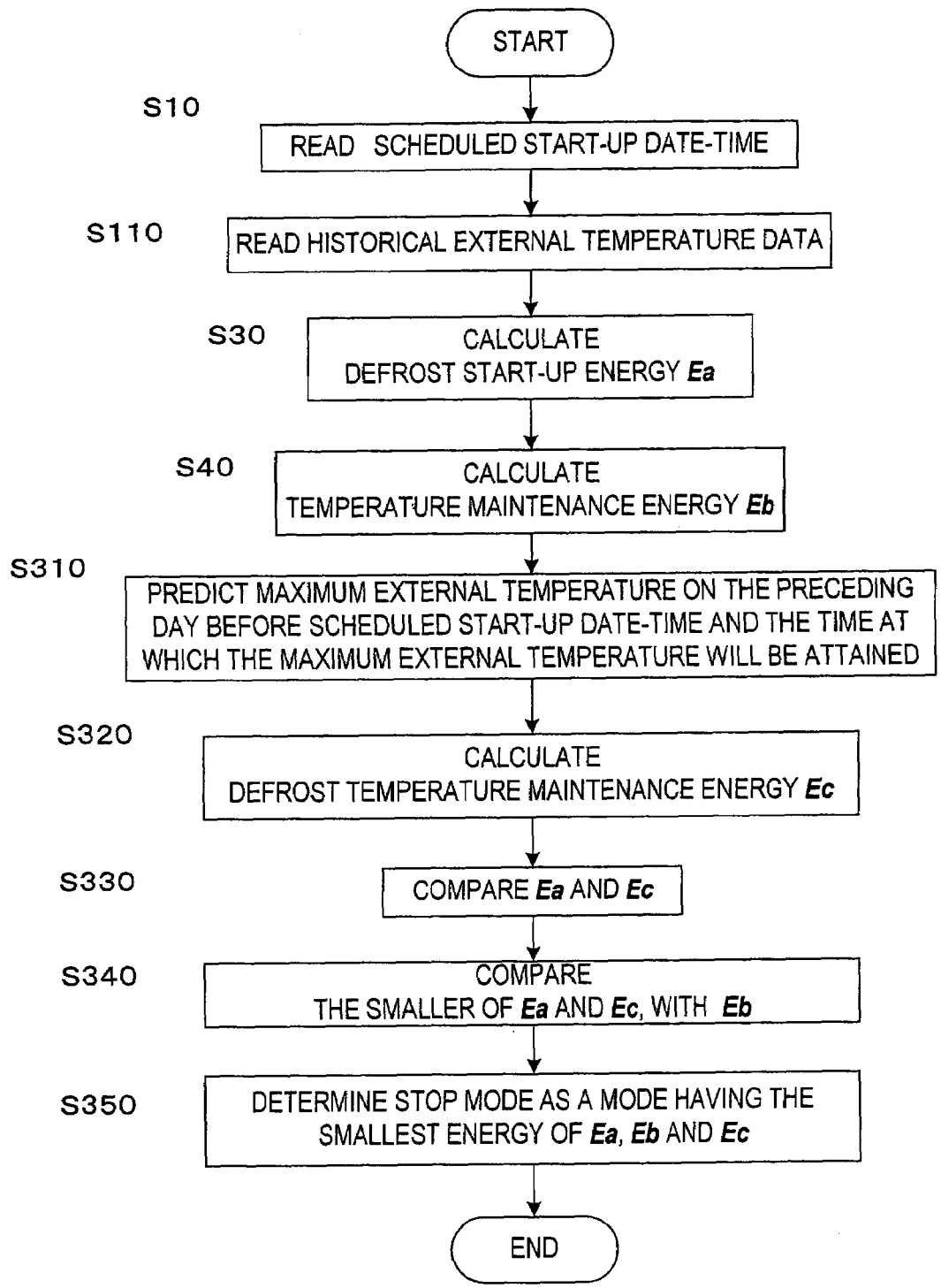
FIG. 13 is a flowchart showing a control routine according to the sixth embodiment.

The flowchart in FIG. 13 shows a control routine executed by the controller 100 during shut down of the fuel cell system.

Firstly in a step S10, the scheduled start-up date-time (for example time t3 in FIG. 12) is entered by a user or the like. The historical external temperature data is read in the step S110. In the step S30, the defrost start-up energy required for melting operations during start-up is calculated by predicting the external temperature for the scheduled start-up date-time, in other words, the external temperature which will be attained at the scheduled start-up date-time. In the step S40, The temperature maintenance energy is calculated.

Furthermore in a step S310, the controller predicts the maximum external temperature on the preceding day before the scheduled start-up date-time and the time at which the maximum external temperature will be attained, based on the historical external temperature data. In a step S320, the defrost start-up energy at the maximum external temperature is calculated as a first energy consumption. The first energy consumption is the energy consumed by the heater in heating the water in the fuel cell system to the second predetermined temperature at the maximum external temperature. In addition, a second energy consumption is calculated. The second energy consumption is the energy required to maintain the temperature of the fuel cell system after the attainment of the maximum external temperature until the scheduled start-up date-time. The first and second energy consumption are added together and set as the defrost temperature maintenance energy Ec.

In a step S330, the defrost start-up energy Ea calculated in the step S30 is compared with the defrost temperature maintenance energy Ec and then the smaller of the defrost start-up energy Ea and defrost temperature maintenance energy Ec is selected. In the step S340, the smaller of the defrost start-up energy Ea and defrost temperature maintenance energy Ec is compared with temperature maintenance energy Eb calculated in the step S40 in order to search the smallest energy of Ea, Eb and Ec. In the step S350, the stop mode is determined as a mode having the smallest energy consumption of Ea, Eb and Ec. That is to say, in the steps S330 to S350, the stop mode having minimum energy consumption is selected from defrost start-up mode, temperature maintenance mode, and defrost temperature maintenance mode.

When the defrost temperature maintenance energy Ec is smaller than the temperature maintenance energy Eb and the defrost start-up energy Ec, the controller 100 controls the second heater 11 to heat the water in the pure water tank 3 to the second predetermined temperature at the time at which the maximum external temperature has been attained on the day before the scheduled start-up date-time and then control the first heater 10 to maintain the second predetermined temperature so that the water in the fuel cell system does not freeze in the period after the time of the attainment of the maximum external temperature until the scheduled start-up date-time.

The entire contents of Japanese Patent Application P2002-197118 (filed Jul. 5, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A control device for a fuel cell system comprising a fuel cell acting as a power source, the control device comprising:
 a heater for heating water in the fuel cell system;
 a user interface allowing a user to command a scheduled start-up date-time to a controller; and
 the controller for controlling the operation of the heater and a startup and shutdown operations of the fuel cell system, the controller comprising a historical external temperature data for a period prior to a shutdown of the fuel cell system; the controller functioning to:
 calculate temperature maintenance energy, wherein the temperature maintenance energy is the energy consumed by the heater in order to maintain water in the fuel cell system to a first predetermined temperature in a period after the shutdown of the fuel cell system until the scheduled start-up date-time;
 predict an external temperature for the scheduled start-up date-time based on the historical external temperature data;
 calculate defrost start-up energy, wherein the defrost start-up energy is the energy consumed by the heater in order to heat water in the fuel cell system to a second predetermined temperature when the fuel cell system undergoes the start-up operation, the calculation being performed based on the predicted external temperature for the scheduled start-up date-time;
 compare the temperature maintenance energy and the defrost start-up energy; and
 control the heater to maintain water in the fuel cell system to the first predetermined temperature in a period after the shutdown of the fuel cell system until the scheduled start-up date-time if the temperature maintenance energy is smaller than or equal to the defrost start-up energy,
 and control the heater to heat water in the fuel cell system to the second predetermined temperature when the fuel cell system is started up if the temperature maintenance energy is greater than the defrost start-up energy.

2. The control device as defined in claim 1, further comprising a cooling device for cooling the fuel cell, the water in the fuel cell system being water in the cooling device.

3. The control device as defined in claim 1, wherein the controller functions to calculate the temperature maintenance energy and the defrost start-up energy when the external temperature is below freezing point.

4. The control device as defined in claim 1, wherein the first and second predetermined temperatures are respectively greater than the freezing point of the water in the fuel cell system.

5. The control device as defined in claim 1, further comprising a temperature sensor for detecting an external temperature, the temperature sensor being coupled to the controller;
 wherein the historical external temperature data comprises the external temperature detected by a temperature sensor and the date-time of the detection on a preceding day before the shutdown of the fuel cell system.

6. The control device as defined in claim 1, wherein the historical external temperature data comprises at least a year of historical external temperature data including historical external temperatures on the same day of year as the scheduled start-up date-time.

7. The control device as defined in claim 1, wherein the controller comprises a map showing a relationship between the external temperature and the defrost start-up energy; and the defrost start-up energy is calculated using the map based on the predicted external temperature for the scheduled start-up date-time.

8. The control device as defined in claim 1, further provided with a temperature sensor for detecting an external temperature, the temperature sensor being coupled to the controller; and before the shutdown of the fuel cell system the controller stores an external temperature detected by the temperature sensor at regular time intervals so as to make the historical external temperature data.

9. The control device as defined in claim 1, further comprising an energy consumption detection means for detecting the energy consumed by the heater in order to perform a temperature maintenance operation, and the controller functions to calculate an actual historical energy consumption in a predetermined period after the shutdown of the fuel cell system;

estimate the energy consumed by the heater after the predetermined period until the scheduled start-up date-time; and set the sum of the estimated energy and the actual historical energy consumption as the temperature maintenance energy.

10. The control device as defined in claim 1, wherein the controller functions to:

predict a maximum external temperature and time at which the maximum external temperature will be attained for the day before the scheduled start-up date-time based on the historical external temperature data;

calculate a first energy consumption, wherein the first energy consumption is the energy consumed by the heater in heating the water in the fuel cell system to the second predetermined temperature at the maximum external temperature;

calculate a second energy consumption, wherein the second energy consumption is the energy consumed by the heater so that water in the fuel cell system does not freeze in the period after the time at which the maximum external temperature will be attained until the scheduled start-up date-time;

calculate defrost temperature maintenance energy which is the sum of the first energy consumption and the second energy consumption;

compare the defrost temperature maintenance energy with the temperature maintenance energy and the defrost start-up energy; and when the defrost temperature maintenance energy is smaller than the temperature maintenance energy and the defrost start-up energy, control the heater to heat the water in the fuel cell system to a second predetermined temperature at the time at which the maximum external temperature has been attained on the day before the scheduled start-up date-time and then control the heater to maintain the second predetermined temperature so that the water in the fuel cell system does not freeze in the period after the time of the attainment of the maximum external temperature until the scheduled start-up date-time.

11. The control device as defined in claim 1, further comprising a cooling device for cooling the fuel cell, and a thermal insulation member for covering the fuel cell, the cooling device, and the heater which are provided in the thermal insulation member;

wherein the external temperature is an air temperature outside the thermal insulation member.

12. A control device for a fuel cell system comprising a fuel cell acting as a power source, the control device comprising:

a heater for heating water in the fuel cell system;

means for commanding a scheduled start-up date-time of the fuel cell system;

means for storing a historical external temperature data for a period prior to a shutdown of the fuel cell system;

means for calculating temperature maintenance energy, wherein the temperature maintenance energy is the energy consumed by the heater in order to maintain water in the fuel cell system to a first predetermined temperature in a period after the shutdown of the fuel cell system until the scheduled start-up date-time;

means for predicting an external temperature for the scheduled start-up date-time based on the historical external temperature data;

means for calculating defrost start-up energy, wherein the defrost start-up energy is the energy consumed by the heater in order to heat water in the fuel cell system to a second predetermined temperature when the fuel cell system undergoes the start-up operation, the calculation being performed based on the predicted external temperature for the scheduled start-up date-time;

means for comparing the temperature maintenance energy and the defrost start-up energy;

means for controlling the heater to maintain water in the fuel cell system to the first predetermined temperature in a period after the shutdown of the fuel cell system until the scheduled start-up date-time if the temperature maintenance energy is smaller than or equal to the defrost start-up energy, and means for controlling the heater to heat water in the fuel cell system to the second predetermined temperature when the fuel cell system is started up if the temperature maintenance energy is greater than the defrost start-up energy.

13. A control method for controlling a fuel cell system having a fuel cell acting as a power source and a heater for heating water in the fuel cell system;

the control method comprising the steps of:

commanding a scheduled start-up date-time of the fuel cell system; storing a historical external temperature data for a period prior to a shutdown of the fuel cell system;

calculating temperature maintenance energy, wherein the temperature maintenance energy is the energy consumed by the heater in order to maintain water in the fuel cell system to a first predetermined temperature in a period after a shutdown of the fuel cell system until the scheduled start-up date-time;

predicting an external temperature for the scheduled start-up date-time based on the historical external temperature data;

calculating defrost start-up energy, wherein the defrost start-up energy is the energy consumed by the heater in order to heat water in the fuel cell system to a second predetermined temperature when the fuel cell system undergoes the start-up operation, the calculation being performed based on the predicted external temperature for the scheduled start-up date-time;

comparing the temperature maintenance energy and the defrost start-up energy;

controlling the heater to maintain water in the fuel cell system to the first predetermined temperature in a period after the shutdown of the fuel cell system until the scheduled start-up date-time if the temperature maintenance energy is smaller than or equal to the defrost start-up energy, and controlling the heater to heat water in the fuel cell system to the second predetermined temperature when the fuel cell system is started up if the temperature maintenance energy is greater than the defrost start-up energy.

* * * * *